Jan. 18, 1938.   R. G. LE TOURNEAU   2,105,744
TOOL SLIDE
Filed June 1, 1937   3 Sheets-Sheet 2

INVENTOR
R. G. LeTourneau
BY
ATTORNEY

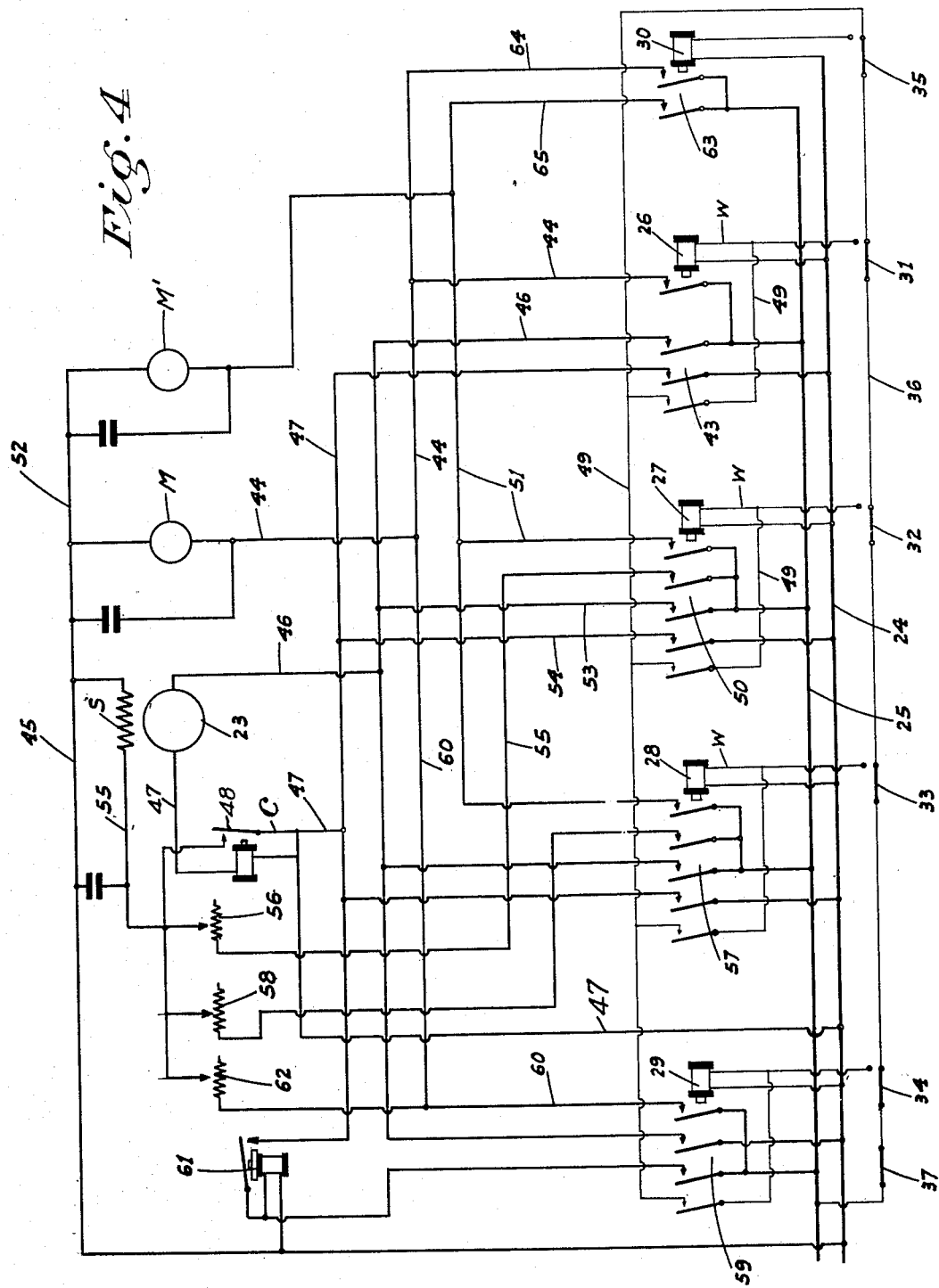

Patented Jan. 18, 1938

2,105,744

UNITED STATES PATENT OFFICE 2,105,744

TOOL SLIDE

Robert G. Le Tourneau, Peoria, Ill., assignor to R. G. Le Tourneau, Inc., Peoria, Ill.

Application June 1, 1937, Serial No. 145,745

17 Claims. (Cl. 82—24)

This invention relates to tool slides for lathes and particularly to an electrically actuated and controlled tool slide.

One object of the invention is to provide a slide of this character having a tool holding quill arranged to be moved to and from the work by an electric motor, and a means controlled by the movement of the quill for automatically varying the speed of the motor and that of the feed stroke of the quill as the position of the work relative to the tool and the nature of the work may require, and for automatically reversing the motor to retract the quill after the latter has reached the limit of its feed stroke.

A further important object of my invention is to provide a means for automatically and instantly stopping the motor and quill when fully retracted, without any coasting of the same. In connection with the above objects, the stopping mechanism, except for circuit features, is the same as that used in controlling the forward feed, so that little additional manufacturing expense is involved.

Another object is to arrange the control means so that the different operations—the change of the motor from one speed to another, and the stopping of the mechanism—may be made to take place at different points in the length of the stroke of the quill, and may also be actuated by hand instead of automatically if desired.

These objects I accomplish by means of such structure and relative arrangement of parts as will fully appear by a perusal of the following specification and claims.

In the drawings similar characters of reference indicate corresponding parts in the several views:

Figure 4 is a diagram of the circuit arrangement.

Figure 1:
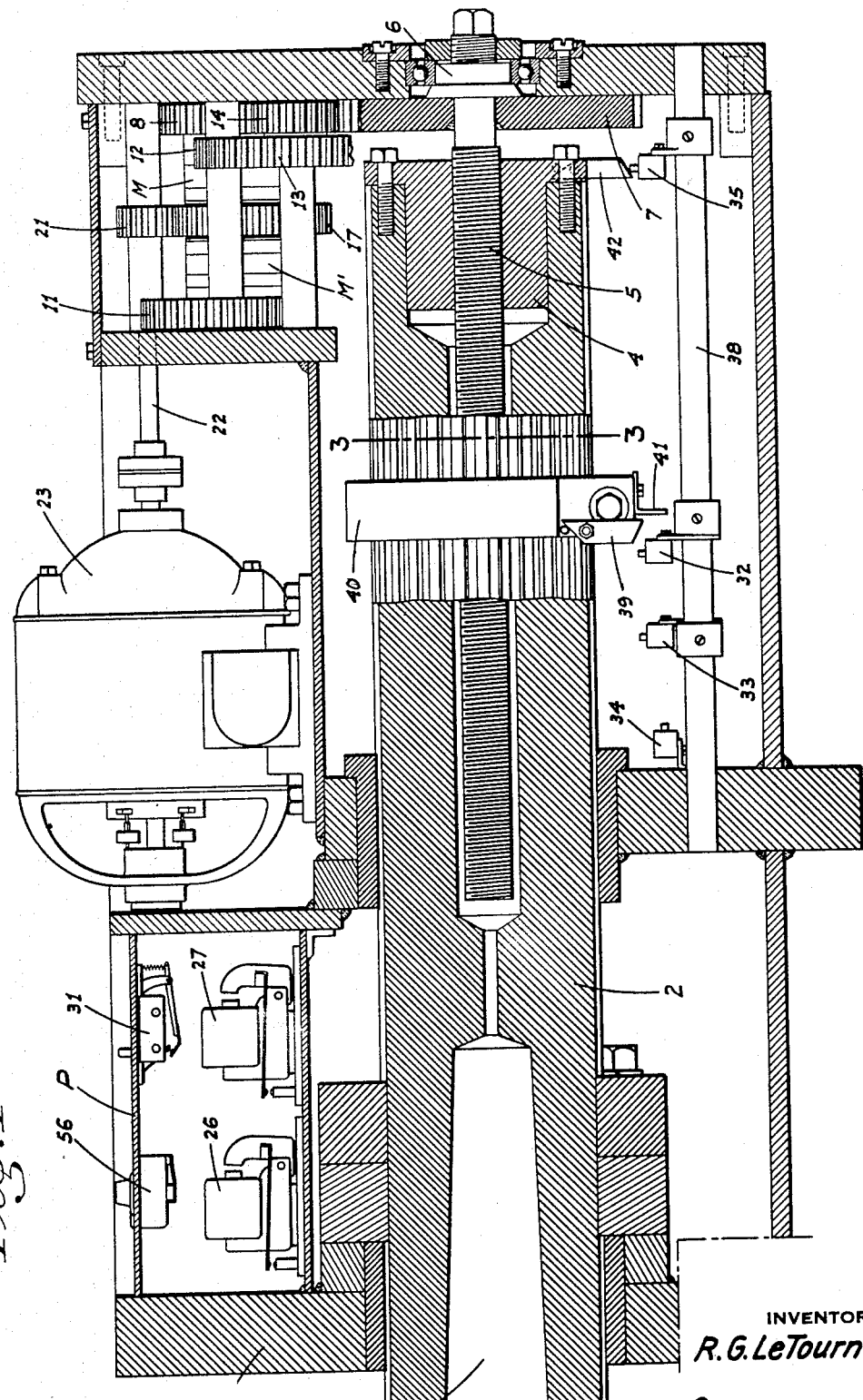
Figure 1 is a sectional elevation of my improved tool slide, the circuit wiring being omitted.
Figure 2:
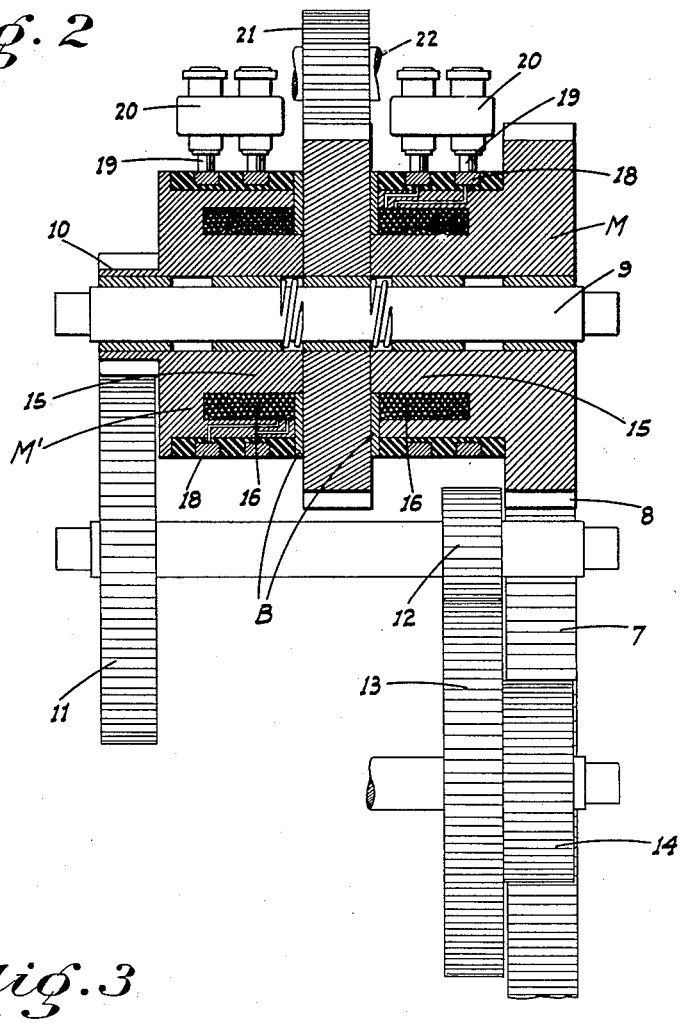
Figure 2 is an enlarged fragmentary section showing the magnetic clutches and the gearing connections with the screw spindle, the relative position of the different gears being shown somewhat diagrammatically.
Figure 3:
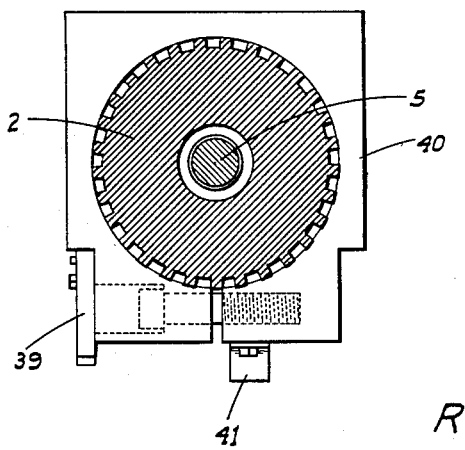
Figure 3 is a fragmentary cross section on the line 3—3 of Figure 1.

Referring now more particularly to the characters of reference on the drawings, the slide 50 comprises a rigid housing 1 adapted to be removably bolted onto a lathe bed in any suitable manner. Slidably splined in and extending lengthwise of the housing is the tool holding quill 2, having a taper socket 3 in its forward end for the reception of the tool. Secured in the opposite end of the quill is a nut 4 through which is threaded a screw spindle 5, held against axial movement in a suitable bearing 6 in the adjacent end of the housing.

Fixed on the spindle between the bearing and nut is a spur gear 7. This meshes with another gear 8 rigid with a magnetic clutch M later described, and turnable on a counter shaft 9 parallel to the spindle. Another similar clutch M' is also turnable on the shaft 9 and carries a pinion 10 10 meshing with a gear 11. This gear is rigid with a pinion 12 which in turn meshes with another gear 13, having a pinion 14 fixed therewith and meshing with the gear 7. By reason of this gear train arrangement it will be seen that if the gear 8 is rotated in one direction, the gear 7 and consequently the spindle 5 will be rotated in the opposite direction but at nearly the same speed. If however the pinion 10 is rotated in said one direction the spindle is rotated in the same direction as before but at a greatly reduced speed. Consequently if both the gear 8 and pinion 10 and their corresponding magnetic clutches, are both rotated simultaneously and at the same speed, a braking effect is placed on the gear 7 and the spindle 5, preventing any movement thereof. This action I make use of in stopping the reverse travel of the quill as will be seen later.

The magnetic clutches M and M' each comprise a cylindrical shell 15 turnable and slidable on the shaft 9, and having a magnetic coil 16 therein concentric with the shaft. The coils of the two clutches are disposed in facing relation to and act on the opposite faces of a gear 17 mounted on the shaft 9 between the clutches. Discs B of brake lining material are mounted on the shells over the outer ends of the coils to frictionally engage the adjacent flat faces of the gear 17. The shells carry contact rings 18 about their outer periphery, insulated from each other and connected to the corresponding coils. These rings are engaged by brushes 19 mounted in supporting brackets 20 secured on the housing 1. The gear 17 meshes with a pinion 21 connected to the drive shaft 22 of a variable speed reversible electric motor 23 mounted in a recess in the housing above the quill.

The circuits for the motor and magnetic clutches are connected to supply wires 24 and 25 as follows: a number of separate relays 26, 27, 28, 29 and 30 (in the order in which they are normally used in the feed and reverse travel of the quill) are mounted in the housing 1, preferably above the quill and at the forward end of the housing. One terminal of these relays is connected to the wire 24, while the other terminals are connected by individual wires W to the normally open contacts of micro-switches 31, 32, 33, 34 and 35 respectively. These switches are a standard single pole double throw type, interposed in series in and normally closing an auxiliary circuit wire 36 connected at one end to the wire 25, a hand switch 37 (which may also be of the micro type) being also interposed in said wire. These switches are designed so that when thrown from a normal position to engage the relay contacts and then released, they instantly snap back of themselves to said normal position.

The switch 31 is mounted on the housing so as to be convenient for hand operation as shown in Fig. 1. The switches 32 and 33 are adjustably mounted on a bar 38 extending lengthwise in the housing under and parallel to the quill, and in the path of advancing movement of a switch throwing dog 39. This dog is swivelly mounted on a holder 40 clamped about the quill and arranged so that while it is held rigid when engaging any switch with the feed stroke of the quill, it will yield without actuating the switch with the reverse movement of the quill.

The switch 34 is mounted in a fixed position in the housing in the path of a fixed contactor 41 mounted on the holder 40, and adapted to be thrown by said contactor when the quill has reached the forward limit of its feed stroke. The switch 35 is mounted on the bar 38 adjacent the back end of the housing in position to be thrown by a dog 42 yieldably mounted on the quill at its rear end, when said quill has about reached its limit of reverse movement. It may here be noted that the switches 32, 33 and 35 are disposed so that they are accessible for adjustment as well as hand operation from one side of the housing. In this manner the different switches may be thrown at various points in the length of travel of the quill, as the work may require.

The relay 26 when energized closes a multiple contact switch 43. This closes a circuit through the high speed magnetic clutch M by means of a wire 44 connecting one brush of the clutch and the wire 25, and another wire 45 connecting the other brush and the wire 24. A circuit is also closed to the armature of motor 23 by means of a wire 46 connecting the wire 25 and one brush of the armature, and another wire 47 leading to the wire 24 and in which the coil of a relay switch 48 is interposed in series. Switch 48 is interposed in a by-pass circuit C connecting wire 47 ahead of the relay coil and wire 45 beyond the clutches, and in which the shunt field S of the motor is interposed.

The purpose of this arrangement is as follows: When the motor is set for high speed (as it is when switch 43 is closed) it has a weak field. The wiring of the coil of switch 48 is such that it will close only with a heavy current, as when the motor first starts up with its load. The circuit C is then closed shunting some of the current to the motor field and boosting the same, as is required to enable the motor to rapidly attain its high speed. As soon as this occurs and a normal current only is required, the relay coil becomes insufficiently energized to close switch 48, and circuit C remains open.

Finally a normal break in a holding circuit is closed through a wire 49 leading from the wire W of the relay 26 to the normally engaged contact of the switch 35. Or said wire 49 may be considered as being connected to the wire 36 beyond the switch 35. As a result therefore throwing the switch 31 from its initial position to a relay energizing position causes the motor to be driven, the clutch M to be energized so that it is locked against the gear 17, and the quill advances rapidly toward the work from its fully reversed or retracted position. As soon as the switch 31 is released it snaps back of itself to its original position as stated. This breaks the direct connection with the relay 26, but it moves so fast as to complete the relay holding circuit (through switches 31 and 43, and wires 49 and 36) before the relay has a chance to let go.

As soon as the dog 39 on the quill with the advancing movement of the latter, reaches the switch 32 it throws said switch from its normal position in engagement with the wire 36, to a position to close a circuit through the relay 27. The circuit through the wire 36 is thus broken, releasing the holding circuit above described so that the multiple contact switch 43 opens and the magnetic clutch M becomes deenergized.

Energized relay 27 closes another multiple contact switch 50. A circuit is then closed to the magnetic clutch M' through a wire 51 and another wire 52 connecting the wire 45. The motor circuit is also again closed, through a wire 53 and a portion of the wire 46, and a wire 54 and a portion of the wire 47. The motor current also passes by wire 55 (which is a portion of circuit C) to the shunt field S of the motor through a rheostat 56, so that the speed of the motor may be selectively varied by the operator. A break is also closed as before between the holding circuit wire 49 and another wire 49' connected to the wire W of the adjacent relay. The quill thus advances, now in contact with the work, at a relatively slow speed as determined by the reduction speed gear train connected to the clutch M', and the speed of the motor as determined by the setting of the rheostat. When the dog 39 passes by and releases the switch 32, the latter returns to its original position but the relay 27 remains energized and the switch 50 remains closed in the same manner as shown in connection with the operation of the switch 31.

When the dog 39 reaches and actuates the switch 33, the relay 27 is instantly released and the relay 28 becomes energized. Another multiple contact switch 57 is then closed. A circuit is again closed through the magnetic clutch M', as well as through the motor 23, but this time the current is passed to the shunt field of the motor through another rheostat 58, so that the speed of the motor and consequently that of the quill may be again selectively varied. Also a normal break in the holding circuit wire 49 is closed in much the same manner as previously described.

When the quill reaches its forward limit of travel the contactor 41 actuates the switch 34, throwing it to a position to close the relay 29. As before this immediately breaks the holding circuit previously closed, deenergizing the relay 28 and opening switch 57. Energized relay 29 closes another multiple contact switch 59. This closes a circuit through the high speed magnetic clutch M, said circuit including a wire 60 connected to the wire 44. A circuit through a time delay motor reversing relay switch 61 is also closed and the motor circuit is closed to drive the motor in a reverse direction. The current to the motor then passes through a third rheostat 62 so that the travel may be speeded up if desired during the reverse movement of the quill.

A holding circuit connection with the wire 49 is also made. The various rheostats are all mounted in the housing in a position convenient to the operator, preferably in connection with a panel P which supports the switches 31 etc. as indicated in Fig. 1.

The time delay switch is mainly for the purpose of allowing the quill and tool to dwell in its extended position for a few seconds (depending on the setting of the delay switch) or until the tool has time to clear up its cut before the quill is actually reversed in its travel. Also a certain protection is afforded the motor by giving it a chance to actually stop before it is reversed. During the reverse travel of the quill the switches 33 and 32 are not again actuated, since the swivelly mounted dog 39 passes over said switches without affecting them.

When adjacent the rear end of the reverse travel of the gear, the dog 42 engages and throws the switch 35, energizing the relay 30. The reverse travel-controlling holding circuit is thus broken and the motor stops. At the same time energized relay 30 closes a double pole switch 63. A circuit is then closed through the magnetic clutch M' by means of a wire 64 and a portion of wire 44 and a circuit is also closed through the clutch M through a wire 65 and a portion of wire 51. Both clutches are thus simultaneously energized and locked to the gear 17 therebetween. This results, for the reason previously explained, in the immediate halting of the quill and preventing any coasting movement of the same. As soon as the switch 35 is released from the dog 42, the relay 30 becomes deenergized, the switch 63 is opened and the machine remains idle with all switches in their initial normal position. The motor will not then again start until the hand actuated switch 31 is thrown. The hand switch 37 need only be used when it is desired or necessary to stop the tool at some point in the length of its stroke.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tool slide comprising a housing, a tool-holding quill slidably mounted in the housing for axial movement, a rotary driving member, a pair of magnetic clutches arranged in connection with said member to separately cooperate in locking relation therewith, a driving connection between one clutch and the quill to move the same axially, a similar connection between the other clutch and the quill to also move the same axially in the same direction but at a different speed with the same speed of the driving member, and means to selectively energize the clutches.

2. A tool slide comprising a housing, a tool-holding quill slidably mounted in the housing for axial movement, a rotary driving member, a pair of magnetic clutches arranged in connection with said member to separately cooperate in locking relation therewith, a driving connection between one clutch and the quill to move the same axially, a similar connection between the other clutch and the quill to also move the same axially in the same direction but at a different speed with the same speed of the driving member, means to initially set the driving member and one clutch in operation to start the quill on its feed stroke and means functioning with the movement of the quill a certain distance along said stroke to deenergize said one clutch and energize the other clutch.

3. A structure as in claim 2, with means included in part with said last named means and functioning with the reverse movement of the quill to a predetermined position to energize the other clutch while maintaining said one clutch energized.

4. A structure as in claim 2, with means included in part with said last named means to alter the point in the length of the stroke at which said last named means will function.

5. A structure as in claim 2, with means functioning automatically upon the arrival of the quill at the forward end of its feed stroke to reverse the direction of rotation of the driving member.

6. A structure as in claim 2, with means functioning automatically upon the arrival of the quill at the forward end of its feed stroke to reverse the direction of rotation of the driving member and maintaining one of the clutches energized, and means functioning automatically after a predetermined amount of reverse movement of the quill for stopping the driving of said member without deenergizing said one clutch, and for simultaneously energizing the other clutch.

7. A tool slide comprising a housing, a tool-holding quill slidably mounted in the housing for axial movement, a rotary driving member, a pair of magnetic clutches arranged in connection with said member to separately cooperate in locking relation therewith, a driving connection between one clutch and the quill to move the same axially, a similar connection between the other clutch and the quill to also move the same axially in the same direction but at a different speed with the same speed of the driving member, means to selectively and separately energize the clutches, and separate means included in part with said last named means to simultaneously energize both clutches.

8. A tool slide comprising a housing, a tool-holding quill slidably mounted in the housing for axial movement, a rotary driving member, a pair of magnetic clutches arranged in connection with said member to separately cooperate in locking relation therewith, a driving connection between one clutch and the quill to move the same axially, a similar connection between the other clutch and the quill to also move the same axially in the same direction but at a different speed with the same speed of the driving member, an electric motor to drive said member, means to selectively and separately energize the clutches while placing the motor in operation, and separate means included in part with said last named means to simultaneously energize both clutches and simultaneously discontinue the operation of the motor.

9. A tool slide comprising a housing, a tool-holding quill slidably mounted in the housing for axial movement, a rotary driving member, a pair of magnetic clutches arranged in connection with said member to separately cooperate in locking relation therewith, a driving connection between one clutch and the quill to move the same axially, a similar connection between the other clutch and the quill to also move the same axially in the same direction but at a different speed with the same speed of the driving member, an electric motor to drive said member, separate normally open circuits for the motor and clutches, a self-opening hand operated switch for initially closing the motor circuit and that of one clutch, a holding circuit for the motor circuit and said one clutch circuit closed by opening of the hand switch, another self-opening switch for also closing the motor circuit and for closing the circuit of the other clutch, means carried by the quill to actuate said last named switch after a predetermined movement of the quill along its feed stroke and circuit means included in part with the holding circuit for opening the latter when the last named switch is actuated and for closing a holding circuit for the last named motor and clutch circuits, and means to reverse the motor upon arrival of the quill at the forward limit of its feed stroke.

10. A structure as in claim 9, with means mounting said other switch for adjustment lengthwise of the quill whereby it may be actuated at different selected points in the stroke of the quill.

11. A structure as in claim 9, in which said switch actuating means on the quill comprises a projecting dog, the corresponding switch having an actuating element projecting into the path of the dog, means swivelly mounting the dog on the quill, and a stop engaging the dog to prevent swivel movement thereof when engaging the element during the feed stroke of the quill but allowing such swivel movement when the dog again engages the element with the reverse travel of the quill.

12. A tool slide comprising a housing, a tool-holding quill slidably mounted in the housing for axial movement, a rotary driving member, a pair of magnetic clutches arranged in connection with said member to separately cooperate in locking relation therewith, a driving connection between one clutch and the quill to move the same axially, a similar connection between the other clutch and the quill to also move the same axially in the same direction but at a different speed with the same speed of the driving member, separate normally open circuits for the clutches, a separate relay switch in each circuit, separate relay closing circuits, a double-throw hand switch in one relay circuit normally disposed in a relay-circuit opening position, a holding circuit for said relay having a normally open switch therein closed by the relay and in which said hand switch is interposed in normally closing relation, another double-throw switch interposed in the holding circuit in normally closing relation and also interposed in the circuit of another relay in opening relation, and means carried by the quill to throw said other switch to a relay circuit closing position upon movement of the quill a predetermined distance along its feed stroke whereby to energize the other magnet and at the same time break the holding circuit previously closed.

13. A tool slide comprising a housing, a tool-holding quill slidably mounted in the housing for axial movement, a reversible driving member, means to operatively connect said member with the quill to move the same axially in the housing, means to initially place said member in operation in a direction to advance the quill, and means actuated by the quill when it reaches a predetermined advanced position to reverse the operation of the driving member.

14. A tool slide comprising a housing, a tool-holding quill slidably mounted in the housing for axial movement, a driving member, separate means to operatively and alternately connect said member with the quill to move the same axially in the housing at different speeds, means to initially place one such connecting means in operation to move the quill, and means functioning with the movement of the quill a certain distance to discontinue the operation of said one connecting means and place the other connecting means in operation.

15. A structure as in claim 14, with means included in part with said last named means to alter the point in the travel of the quill at which said last named means will function.

16. A tool slide comprising a housing, a tool-holding quill slidably mounted in the housing for axial movement, a driving member, separate means to operatively and alternately connect said member with the quill to move the same axially in the housing at different speeds, means to initially place one such connecting means in operation to move the quill, and means functioning with the movement of the quill a certain distance to place the other connecting means in operation without discontinuing the operation of said one connecting means.

17. A tool slide comprising a housing, a tool-holding quill slidably mounted in the housing for axial movement, a reversible electric motor, means operatively connecting the motor with the quill to move the same axially of the housing, means to initially place the motor in operation in a direction to advance the quill on its feed stroke, a normally open reversing circuit for the motor, a switch in said circuit closed by the quill upon its arrival at the advanced end of its feed stroke, and means in the circuit to delay the starting of the motor in its reverse direction after the switch is closed.

ROBERT G. LE TOURNEAU.